US010069995B2

United States Patent
Miyazaki et al.

(10) Patent No.: US 10,069,995 B2
(45) Date of Patent: Sep. 4, 2018

(54) OPERATING ENVIRONMENT EVALUATION SYSTEM, CONTROL METHOD, AND PROGRAM

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventors: Sou Miyazaki, Kawasaki Kanagawa (JP); Masaki Narahashi, Shinagawa Tokyo (JP); Hiroyo Tanaka, Koto Tokyo (JP); Tatsuya Inagi, Izu Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/451,646

(22) Filed: Mar. 7, 2017

(65) Prior Publication Data
US 2018/0213105 A1 Jul. 26, 2018

(30) Foreign Application Priority Data
Jan. 25, 2017 (JP) .................................. 2017-010921

(51) Int. Cl.
| | |
|---|---|
| H04N 1/04 | (2006.01) |
| H04N 1/00 | (2006.01) |
| G06Q 30/02 | (2012.01) |
| G06Q 10/00 | (2012.01) |
| G06F 3/12 | (2006.01) |

(52) U.S. Cl.
CPC ......... *H04N 1/00978* (2013.01); *G06F 3/121* (2013.01); *G06F 3/1234* (2013.01); *G06Q 10/20* (2013.01); *G06Q 30/0283* (2013.01); *H04N 1/00992* (2013.01)

(58) Field of Classification Search
CPC .... H04B 17/24; H04B 17/309; H04B 17/364; H04L 1/0003; H04L 1/0009; H04L 1/0071; H04L 1/205; H04L 27/2601; G01D 3/0365; G05B 15/02
USPC .......... 370/232, 479; 455/42, 428; 700/299; 358/1.15, 1.14, 406; 709/223, 224; 347/19, 23, 7; 382/112; 399/1, 8, 83
See application file for complete search history.

(56) References Cited

U.S. PATENT DOCUMENTS

| | | | |
|---|---|---|---|
| 6,701,341 B1 * | 3/2004 | Wu ...................... | A61B 5/0456 128/915 |
| 7,154,630 B1 * | 12/2006 | Nimura .................. | G06Q 30/02 358/1.18 |
| 8,102,431 B2 * | 1/2012 | Kim ....................... | G06Q 10/06 348/211.1 |
| 9,843,695 B2 * | 12/2017 | Genda ................ | H04N 1/00925 |

(Continued)

*Primary Examiner* — Negussie Worku
(74) *Attorney, Agent, or Firm* — Amin, Turocy & Watson LLP

(57) ABSTRACT

There is provided an operating environment evaluation system that includes a physical quantity acquisition unit and a generation unit. The physical quantity unit acquires a physical quantity indicating an operating environment of an image processing apparatus. The generation unit generates an operating environment properness level of the image processing apparatus based on the physical quantity that is acquired by the physical quantity acquisition unit.

10 Claims, 11 Drawing Sheets

(56) References Cited

U.S. PATENT DOCUMENTS

| | | | | |
|---|---|---|---|---|
| 2001/0034745 A1* | 10/2001 | Ishii | G06Q 10/0875 | 715/255 |
| 2002/0083164 A1* | 6/2002 | Katayama | G06Q 10/087 | 709/223 |
| 2003/0076523 A1* | 4/2003 | Ito | H04N 1/00002 | 358/1.14 |
| 2006/0198646 A1* | 9/2006 | Funabiki | G03G 15/5004 | 399/45 |
| 2009/0116858 A1* | 5/2009 | Tomita | G03G 21/203 | 399/27 |
| 2009/0170019 A1* | 7/2009 | Kuramoto | G03G 9/0806 | 430/108.22 |
| 2010/0247120 A1* | 9/2010 | Murata | G03G 21/203 | 399/43 |
| 2011/0076074 A1* | 3/2011 | Yamanouchi | G03G 15/6585 | 399/341 |
| 2011/0091800 A1* | 4/2011 | Kuramashi | G03G 9/0825 | 430/105 |
| 2011/0150549 A1* | 6/2011 | Imaizumi | B65H 7/02 | 399/388 |
| 2012/0140272 A1* | 6/2012 | Funane | G06F 3/1208 | 358/1.15 |
| 2013/0070299 A1* | 3/2013 | Narahashi | H04N 1/00411 | 358/1.15 |
| 2013/0163046 A1* | 6/2013 | Narahashi | G06F 3/1229 | 358/1.15 |
| 2013/0238598 A1* | 9/2013 | Miyazaki | G03G 15/5079 | 707/722 |
| 2014/0358317 A1* | 12/2014 | Nishikawa | G05B 15/02 | 700/299 |
| 2015/0131119 A1* | 5/2015 | Narahashi | H04N 1/00344 | 358/1.15 |
| 2015/0138579 A1* | 5/2015 | Miyazaki | H04N 1/00007 | 358/1.13 |

* cited by examiner

FIG. 2A

| SERIAL NUMBER | OPERATING ENVIRONMENT EVALUATION DATA | OPERATING ENVIRONMENT EVALUATION DATA | ... | OPERATING ENVIRONMENT EVALUATION DATA |
|---|---|---|---|---|

FIG. 2B

| SERIAL NUMBER | ERROR DATA | ERROR DATA | ... | ERROR DATA |
|---|---|---|---|---|

FIG. 2C

| |
|---|
| TIME STAMP |
| TEMPERATURE (°C) |
| HUMIDITY (%) |
| OUTDOOR POWDER PARTICLE MASS CONCENTRATION (mg/m³) |
| INDOOR POWDER PARTICLE MASS CONCENTRATION (mg/m³) |
| NUMBER (TIMES) OF TIMES OF HARDWARE-CAUSED POWER-OFF |
| PROPERNESS LEVEL X(1) |
| PROPERNESS LEVEL X(2) |
| PROPERNESS LEVEL X(3) |
| PROPERNESS LEVEL X(4) |
| PROPERNESS LEVEL X(5) |
| ENVIRONMENT PROPERNESS LEVEL |
| COEFFICIENT k(1) |
| COEFFICIENT k(2) |
| COEFFICIENT k(3) |
| COEFFICIENT k(4) |
| COEFFICIENT k(5) |

FIG. 2D

| |
|---|
| TIME STAMP |
| ERROR CODE |
| DATE AND TIME OF OCCURRENCE |
| DATE AND TIME OF ENDING |
| ... |

FIG. 3A

| |
|---|
| ENVIRONMENT NOTIFICATION |
| SERIAL NUMBER |
| TIME STAMP |
| TEMPERATURE (°C) |
| HUMIDITY (%) |
| OUTDOOR POWDER PARTICLE MASS CONCENTRATION (mg/m$^3$) |
| INDOOR POWDER PARTICLE MASS CONCENTRATION (mg/m$^3$) |
| NUMBER (TIMES) OF TIMES OF HARDWARE-CAUSED POWER-OFF |
| ERROR INFORMATION |

FIG. 3B

| ERROR CODE |
|---|
| DATE AND TIME OF OCCURRENCE |
| DATE AND TIME OF ENDING |
| ... |

FIG. 3C

| ERROR CODE | PHYSICAL QUANTITY |
|---|---|
| E001 | AIR TEMPERATURE |
| E002 | AIR TEMPERATURE, HUMIDITY |
| E003 | AIR CLEANLINESS |

FIG. 4A

| TEMPERATURE T (°C) | PROPERNESS LEVEL |
|---|---|
| $T \leq -1$ OR $35 \leq T$ | 1 |
| $0 \leq T \leq 4$ OR $30 \leq T \leq 34$ | 2 |
| $5 \leq T \leq 9$ OR $25 \leq T \leq 29$ | 3 |
| $10 \leq T \leq 14$ OR $20 \leq T \leq 24$ | 4 |
| $15 \leq T \leq 19$ | 5 |

FIG. 4B

| HUMIDITY H (%) | PROPERNESS LEVEL |
|---|---|
| $81 \leq H$ | 1 |
| $61 \leq H \leq 80$ | 2 |
| $41 \leq H \leq 60$ | 3 |
| $21 \leq H \leq 40$ | 4 |
| $H \leq 20$ | 5 |

FIG. 4C

| INDOOR/OUTDOOR POWDER PARTICLE MASS CONCENTRATION C (mg/m³) | PROPERNESS LEVEL |
|---|---|
| $0.21 \leq C$ | 1 |
| $0.16 \leq C \leq 0.20$ | 2 |
| $0.11 \leq C \leq 0.15$ | 3 |
| $0.06 \leq C \leq 0.10$ | 4 |
| $C \leq 0.05$ | 5 |

FIG. 4D

| NUMBER N (TIMES) OF TIMES OF HARDWARE-CAUSED POWER-OFF | PROPERNESS LEVEL |
|---|---|
| $21 \leq N$ | 1 |
| $16 \leq N \leq 20$ | 2 |
| $11 \leq N \leq 15$ | 3 |
| $6 \leq N \leq 10$ | 4 |
| $N \leq 5$ | 5 |

OPERATING ENVIRONMENT EVALUATION SYSTEM, CONTROL METHOD, AND PROGRAM

CROSS-REFERENCE TO RELATED APPLICATION

This application is based upon and claims the benefit of priority from Japanese Patent Application No. 2017-010921, filed Jan. 25, 2017, the entire contents of which are incorporated herein by reference.

FIELD

Embodiments described herein relate generally to an operating environment evaluation system, a control method, and a program.

BACKGROUND

The frequency with which a malfunction occurs in an image processing apparatus varies due to an operating environment or the like. Accordingly, in the related art, in some cases, the image processing apparatus transmits data relating to maintenance, such as an operation state or an operating environment, to a data center, in order to maintain the image processing apparatus. As a technology relating to the maintenance of the image processing apparatus, there is a technology that predicts the malfunction in the image processing apparatus.

With this technology, it is possible that a service technician avoids the malfunction by performing a maintenance job during a period of time during which the malfunction is predicted to occur. The frequency with which the malfunction occurs in the image processing apparatus cannot be reduced. Therefore, the number of times that the service technician makes a visit to a place where the image processing apparatus is installed, for maintenance, remains the same as in the related art.

DESCRIPTION OF THE DRAWINGS

FIGS. 2A to 2D are diagrams, each illustrating an operating environment evaluation DB and an error DB.

FIGS. 3A to 3C are diagrams, each illustrating a message format of an environment notification and a corresponding-to-correction table.

FIGS. 4A to 4D are diagrams, each illustrating a properness level table.

DETAILED DESCRIPTION

An object of an exemplary embodiment, which was made to solve the problem described above, is to provide an operating environment evaluation system, a control method, and a program, in all of which it is possible that a properness level of an operating environment is generated.

An operating environment evaluation system according to an embodiment includes a physical quantity acquisition unit and a generation unit. The physical quantity unit acquires a physical quantity indicating an operating environment of an image processing apparatus. The generation unit generates an operating environment properness level of the image processing apparatus based on the physical quantity that is acquired by the physical quantity acquisition unit.

If an image formation apparatus according to an embodiment is provided, it is possible that an operating environment evaluation system is provided which is capable of generating a properness level of an operating environment. An operating environment evaluation system according to the embodiment will be in detail described.

An operating environment evaluation system 100 evaluates an operating environment of an image processing apparatus, and generates an operating environment properness level (which is hereinafter expressed as an "environment properness level"). According to the present embodiment, an image processing apparatus, which is an apparatus of which the operating environment has to be evaluated, is capable of communicating with the operating environment evaluation system 100, and is an image formation apparatus that forms an image on a sheet. Furthermore, the image processing apparatuses include measuring instruments that measures various physical quantities, such as a thermometer, a hydrometer, an outdoor air cleanliness (powder particle mass concentration) measuring instrument, an indoor air cleanliness (powder particle mass concentration) measuring instrument, and a hardware-caused power-off detector. It is noted that the hardware-caused power-off means that power supply to the image processing apparatus is interrupted by performing an operation of turning off a hardware switch.

The image processing apparatus periodically transmits an environment notification to the operating environment evaluation system 100. Included in the environment notification are a temperature (C.°), a humidity (%), an outdoor powder particle mass concentration (milligram/cubic meter), an indoor powder particle mass concentration (milligram/cubic meter), and the number (times) of times of hardware-caused power-off, which are measured with the measuring instruments described above. Additionally, with the environment notification, information relating to an error that occurs in the image processing apparatus is also notified.

Figure 1:
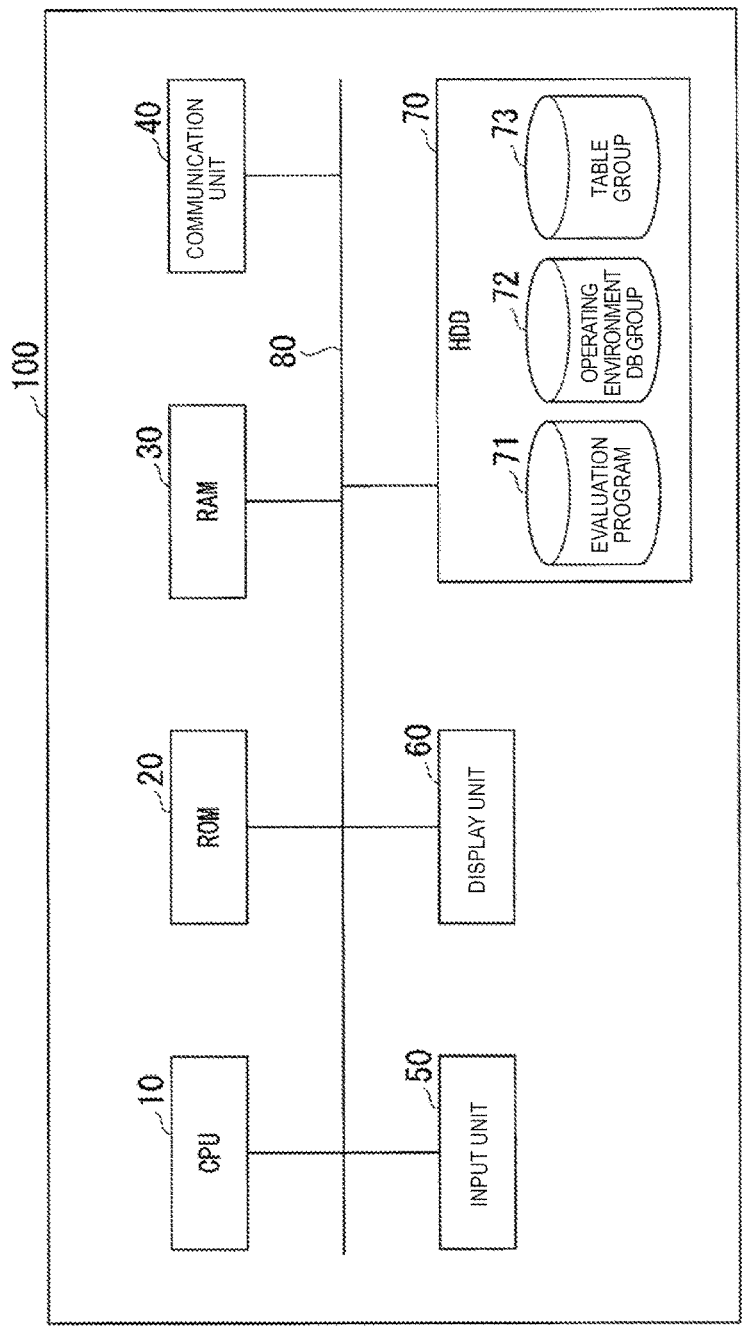
FIG. 1 is a schematic configuration diagram illustrating an implementation example of an operating environment evaluation system.

FIG. 1 is a schematic configuration diagram illustrating an implementation example of the operating environment evaluation system 100 according to the present embodiment.

The operating environment evaluation system 100 is configured with a Central Processing Unit (CPU) 10, a Read Only Memory (ROM) 20, a Random Access Memory (RAM) 30, a communication unit 40, an input unit 50, a display unit 60, and a Hard Disk Drive (HDD) 70. These various devices are connected to each other with a bus 80.

The CPU 10 controls the entire operating environment evaluation system 100. Processing that is illustrated in a flowchart, which will be described below, is performed by the CPU 10. The ROM 20 stores a program, such as a BIOS. The RAM 30 stores various programs, various pieces of data, or the like. The communication unit 40 connects to a Local Area Network (LAN) or the Internet, and communicates with the image processing apparatus or the like. The input unit 50 is configured with a keyboard, a mouse, or the like.

The display unit 60 is a display device such as a liquid crystal display, and display various pieces of information. The HDD 70 stores various pieces of data or various programs. According to the present embodiment, the HDD 70 stores an operating environment evaluation program for performing evaluation or the like of the operating environment of the image processing apparatus. Furthermore, the HDD 70 stores an operating environment database group, which will be described below. In the following description, in some cases, a database is expressed as a DB.

The operating environment database group is configured with an operating environment evaluation DB and an error DB. FIG. 2A is a diagram illustrating a structure of the operating environment evaluation DB. The operating environment evaluation DB is configured with a serial number and one or more pieces of operating environment evaluation data. The serial number is a number for identifying the image processing apparatus in a unique manner. Therefore, the operating environment evaluation DB is provided to every image processing apparatus with which the operating environment evaluation system 100 evaluates the operating environment, with the serial number as a key. The operating environment evaluation data will be in detail described.

The HDD 70 stores a table group. As tables that are included in the table group, there are a corresponding-to-correction table, a temperature properness level table, a humidity properness level table, an indoor/outdoor powder particle mass concentration properness level table, and a number-of-times-of-hardware-caused power-off table. Each table will be described in detail below.

FIG. 2B is a diagram illustrating a structure of the error DB. The error DB is configured with a serial number and one or more pieces of error data. The serial number is the same as the serial number described above. Therefore, the error DB is provided to every image processing apparatus with which the operating environment evaluation system 100 evaluates the operating environment, with the serial number as a key. The error data will be described in detail below.

FIG. 2C is a diagram illustrating a structure of the operating environment evaluation data. The operating environment evaluation data is configured with a time stamp, a temperature (C.°), humidity (%), an outdoor powder particle mass concentration (milligram/cubic meter), an indoor powder particle mass concentration (milligram/cubic meter), the number (times) of times of hardware-caused power-off, an individual properness level $X(n)$ (n=1 to 5), an environment properness level, and a weighting coefficient $k(n)$ (n=1 to 5).

The time stamp is notified with the environment notification. In the same manner, the temperature (C.°), the humidity (%), the outdoor powder particle mass concentration (milligram/cubic meter), the indoor powder particle mass concentration (milligram/cubic meter), and the number (times) of times of hardware-caused power-off are each a physical quantity that is notified with the environment notification. In the following description, in some cases, a unit of each physical quantity is omitted.

Individual properness level $X(n)$ (n=1 to 5) indicates a properness level for every physical quantity. According to the present embodiment, values that individual properness level $X(n)$ (n=1 to 5) can take are 1 to 5. It is indicated that the greater the value, the higher the properness level. Individual properness level $X(1)$ indicates a properness level of the temperature. Individual properness level $X(2)$ indicates a properness level of the humidity. Individual properness level $X(3)$ indicates a properness level of the outdoor powder particle mass concentration. Individual properness level $X(4)$ indicates a properness level of the indoor powder particle mass concentration. Individual properness level $X(5)$ indicates a properness level of the number of times of hardware-caused power-off.

The environment properness level is a value that is calculated from the individual properness level and a weighting coefficient which is provided to every individual properness level, and indicates the properness level of the operating environment of the image processing apparatus. The weighting coefficient is weighting coefficient $k(n)$ (n=1 to 5). Weighting coefficient $k(1)$ indicates a weighting coefficient of individual properness level $X(1)$. Weighting coefficient $k(2)$ indicates a weighting coefficient of individual properness level $X(2)$. Weighting coefficient $k(3)$ indicates a weighting coefficient of individual properness level $X(3)$. Weighting coefficient $k(4)$ indicates a weighting coefficient of individual properness level $X(4)$. Weighting coefficient $k(5)$ indicates a weighting coefficient of individual properness level $X(5)$. These weighting coefficients, which will be described below, is changed according to the acquired error. Furthermore, the weighting coefficient each takes values of 0 to 5, and the default is 1. According to the present embodiment, the environment properness level is calculated using Equation 1 that follows.

$$\text{Environment properness level} = 100 \times WM/SK \quad \text{(Equation 1)}$$

where WM and SK are as follows.

$WM = k(1) \times X(1) + k(2) \times X(2) + k(3) \times X(3) + k(4) \times X(4) + k(5) \times X(5)$.

$SK = 5 \times (k(1) + k(2) + k(3) + k(4) + k(5))$. Because a maximum value of individual properness level $X(n)$ (n=1 to 5) is 5, a maximum value of the environment properness level is 100.

FIG. 2D is a diagram illustrating a structure of the error data. The error data is configured with a time stamp, an error code, a date and time of occurrence, and a date and time of ending. Among these, a combination of the error code, the data and time of occurrence, and the date and time of ending is provided to only the number of errors that occur. The time stamp is notified with the environment notification. In the same manner, the error code, the date and time of occurrence, and the date and time of ending are pieces of information that are notified with the environment notification.

The error code is a code for identifying error in a unique manner. The date and time of occurrence indicates a date and time if an error that is expressed in the error code occurs. The date and time of ending indicates a date and time if the error that is expressed in the error code ends. It is noted that, if an error occurs and does not end, NULL is set.

FIG. 3A is a diagram illustrating a message format of the environment notification. The message format of the environment notification is configured with an "environment notification," a serial number, a time stamp, a temperature, a humidity, an outdoor powder particle mass concentration, an indoor powder particle mass concentration, the number of times of hardware-caused power-off, and error information. Among these, the "environment notification" is a header which indicates that the message is the environment notification.

The serial number is a serial number of the image processing apparatus that transmits the environment notification. The time stamp indicates a point in time if the environment notification is transmitted. The temperature, the humidity, the outdoor powder particle mass concentration, the indoor powder particle mass concentration, and the number of times of hardware-caused power-off are physical quantities in the image processing apparatus that transmits the environment notification. The error information indicates details on the occurrence of the error. With this environment notification message, for example, it is notified that the temperature is 20° C., the humidity is 50%, that the outdoor powder particle mass concentration is 0.2 milligrams/cubic meter, that the indoor powder particle mass concentration is 0.1 milligrams/cubic meter, and that the number of times of hardware-caused power-off is 5, and the like.

FIG. 3B is a diagram illustrating a format of the error information in the environment notification. Because the error code, the date and time of occurrence, and the date and time of ending are the same as those which are described with reference to FIG. 2D, descriptions thereof are omitted. As the error information, is provided to only combinations of the error code, the date and time of occurrence and the date and time of ending are provided as many as the number of errors that occur.

FIG. 3C is a diagram illustrating the corresponding-to-correction table which indicates the error code and a physical quantity that corresponds to the error code. As will be described below, according to the present embodiment, a physical quantity corresponding to an error is corrected. For this correction, the corresponding-to-correction table is used. Specifically, for example, in the case of error code E002, the temperature and the humidity are corrected.

FIG. 4 is a diagram illustrating the properness level table that corresponds to each physical quantity. According to the present embodiment, the individual properness level that is a properness level of each physical quantity is acquired. Then, the properness level of the operating environment is generated using the acquired individual properness level and the weighting coefficient. As individual properness levels, there are a properness level of the temperature, a properness level of the humidity, properness levels of the indoor powder particle mass concentration and the outdoor powder particle mass concentration, and a properness level of the number of times of hardware-caused power-off. In the following description of each table, units are omitted. Furthermore, according to the present embodiment, values that the temperature, the humidity, and the number of times of hardware-caused power-off can take are integer values, and a value that the indoor/outdoor powder particle mass concentration can take is a numerical value including and up to 2 decimal places.

FIG. 4A is a diagram illustrating the temperature properness level table for acquiring the properness level of the temperature. In the temperature properness level table, if temperature T is T≤−1 or 35≤T, the properness level is 1. If temperature T is 30≤T≤34, the properness level is 2. If temperature T is 5≤T≤9 or 25≤T≤29, the properness level is 3. If temperature T is 10≤T≤14 or 20≤T≤24, the properness level is 4. If temperature T is 15≤T≤19, the properness level is 5.

FIG. 4B is a diagram illustrating the humidity properness level table for acquiring the properness level of the humidity. In the humidity properness level table, if humidity H is 81≤H, the properness level is 1. If humidity H is 0≤H≤4 or 61≤H≤80, the properness level is 2. If humidity H is 41≤H≤60, the properness level is 3. If humidity H is 21≤H≤40, the properness level is 4. If humidity H is H≤20, the properness level is 5.

FIG. 4C is a diagram illustrating the powder particle mass concentration properness level table for acquiring the properness levels of the indoor and outdoor powder particle mass concentrations. In the powder particle mass concentration properness level table, if powder particle mass concentration C is 0.21≤C, the properness level is 1. If powder particle mass concentration C is 0.16≤C≤0.20, the properness level is 2. If powder particle mass concentration C is 0.11≤C≤0.15, the properness level is 3. If powder particle mass concentration C is 0.06≤C≤0.10, the properness level is 4. If powder particle mass concentration C is C≤0.05, the properness level is 5. It is noted that, as is illustrated in FIG. 4C, the indoor and outdoor powder particle mass concentrations are assumed to be the same, but tables that correspond to the indoor and outdoor powder particle mass concentrations, respectively, may be provided.

FIG. 4D is a diagram illustrating a number-of-times-hardware-caused power-off table for acquiring the properness level of the number of times of hardware-caused power-off. In the number-of-times-hardware-caused power-off table, if the number N of times of hardware-caused power-off is 21≤N, the properness level is 1. If the number N of times of hardware-caused power-off is 16≤N≤20, the properness level is 2. If the number N of times of hardware-caused power-off is 11≤N≤15, the properness level is 3. If the number N of times of hardware-caused power-off is 6≤N≤10, the properness level is 4. If the number N of times of hardware-caused power-off is N≤5, the properness level is 5.

A flow of processing by the operating environment evaluation system 100 will be described below with reference to the flowchart. The operating environment evaluation system 100 according to the present embodiment is capable of receiving a properness level request and a charge request, as well as of receiving the environment notification described above. The properness level request and the charge request are transmitted from a different apparatus. The different apparatus, for example, is a terminal of a service technician, a terminal in a maintenance center that maintains the image processing apparatus, or the like.

The properness level request is a request for causing a transmission source to transmit an environment properness level of a certain image processing apparatus. For example, if the service technician wants to know the environment properness level of the image processing apparatus of which he is in charge, and the like, the properness level request is transmitted from the terminal of the service technician. The serial number of the image processing apparatus is set, as a parameter, to be in the properness level request. The operating environment evaluation system 100 that receives this request provides the environment properness level to a different apparatus (the terminal of the service technician, or the like).

The charge request is a request for causing the transmission source to transmit a maintenance charge for a certain image processing apparatus. For example, if an operator at the maintenance center wants to know the maintenance charge in response to a request from a customer, or the like, the charge request is transmitted from the terminal in the maintenance center. The serial number of the image processing apparatus and the maintenance charge are set, as parameters, to be in the properness level request. The operating environment evaluation system 100 that receives this request provides the maintenance charge to a different apparatus (the terminal in the maintenance center, or the like).

Figure 5:
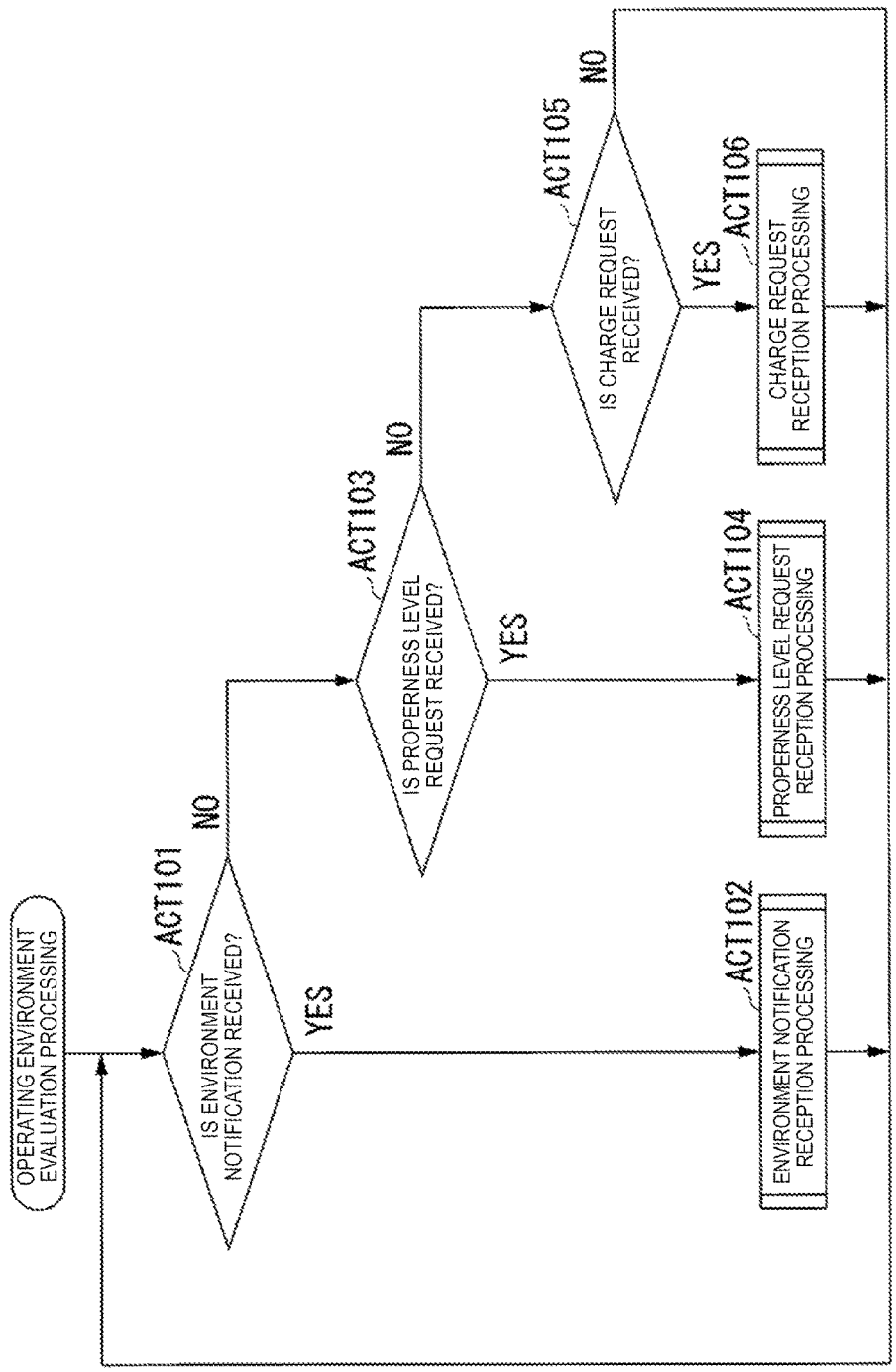
FIG. 5 is a flowchart illustrating a flow of operating environment evaluation processing.

In this manner, the operating environment evaluation system 100 performs processing that corresponds to the environment notification, the properness level request, and the charge request, as operating environment evaluation processing. FIG. 5 is a flowchart indicating a flow of the operating environment evaluation processing. In FIG. 5, the CPU 10 determines whether or not the environment notification is received (ACT 101). If the environment notification is received (YES in ACT 101), the CPU 10 performs environment notification reception processing, which will be described below, (ACT 102), and returns to ACT 101.

In ACT 101, if the environment notification is not received (NO in ACT 101), the CPU 10 determines whether or not the properness level request is received (ACT 103). If the properness level request is received (YES in ACT 103), the CPU 10 performs properness level request reception processing, which will be described below, (ACT 104), and returns to ACT 101.

In ACT 103, if the properness level request is not received (NO in ACT 103), the CPU 10 determines whether or not the charge request is received (ACT 105). If the charge request is received (YES in ACT 105), the CPU 10 performs charge request reception processing, which will be described below, (ACT 106), and returns to ACT 101. In ACT 105, if the charge request is not received (NO in ACT 105), the CPU 10 returns to ACT 101 without performing any processing.

Figure 6:
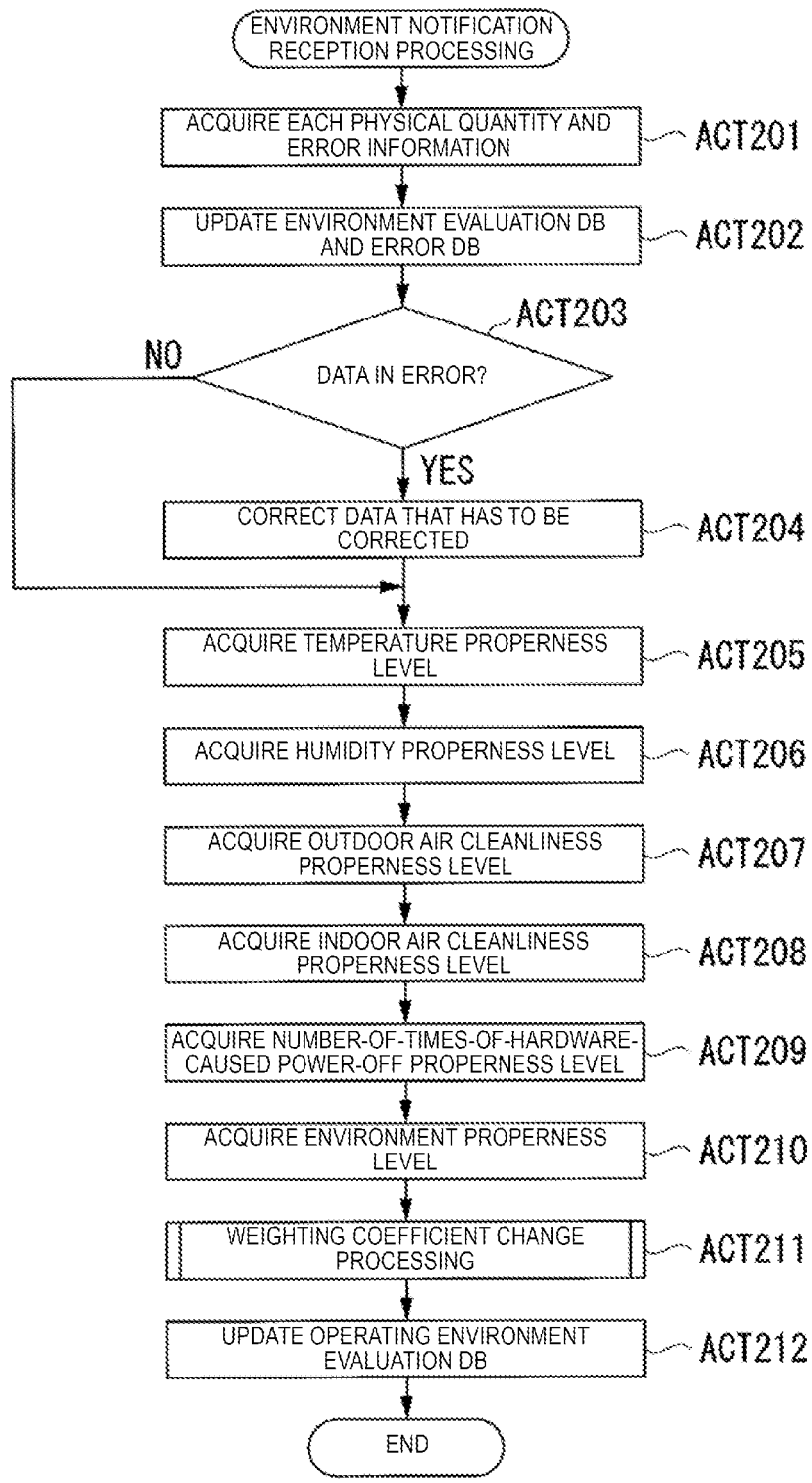
FIG. 6 is a flowchart illustrating a flow of environment notification reception processing.

FIG. 6 is a flowchart illustrating of a flow of the environment notification reception processing. In FIG. 6, the CPU 10 acquires each physical quantity and the error information from the environment notification (ACT 201). The CPU 10 updates the operating environment evaluation DB and the error DB with each physical quantity and the error information, which are acquired (ACT 202). A specific detail of the update is new operating environment evaluation data that is added to the operating environment evaluation DB for the serial number that is expressed in the environment notification. In the same manner, new error data is added to the error DB for the serial number that is expressed in the environment notification. It is noted that individual properness level $X(n)$ and the environment properness level are acquired from these pieces of operating environment evaluation data that are added to the operating environment evaluation DB. Furthermore, weighting coefficient $k(n)$ results from copying a coefficient of the immediately-proceeding operating environment evaluation data. If the immediately-proceeding operating environment evaluation data is not present, a default value that is prescribed in advance is set for weighting coefficient $k(n)$.

If each physical quantity is acquired, the CPU 10 determines whether or not each physical quantity is data that is in error (ACT 203). Each physical quantity that is notified with the environment notification is a value if the image processing apparatus transmits the environment notification. Consequently, if NULL is set to be in the date and time of ending, among pieces of error information that are acquired, the CPU 10 can determine that an error occurs.

If each physical quantity is not data that is in error (ACT 203), the CPU 10 proceeds to ACT 205. If each physical quantity is data that is in error (ACT 203), the CPU 10 corrects the data in error (ACT 204). The data in error is data, a physical quantity that corresponds to an error code that is illustrated in FIG. 3C. That is, the CPU 10 sets a physical quantity that corresponds to an error code that is indicated by the error information, to be a physical quantity that has to be corrected, and corrects data, a physical quantity that is the physical quantity to be corrected. In a correction method, a physical quantity is corrected to be the highest properness level in the properness level table. For example, if a physical quantity that is a physical quantity which has to be corrected is the temperature, the physical quantity is corrected to be any value (for example, 17) that satisfies $15 \leq T \leq 19$ (refer to FIG. 4C) where the properness level is 5.

The reason for this correction is to prevent a situation where it cannot be determined whether abnormality of the physical quantity results from a user environment or from a malfunction in a main body of the measuring instrument or the image processing apparatus from bringing about a disadvantage to a user. It is noted that the correction here is not correction of data in the operating environment evaluation DB, and is performed on data that is stored in the RAM 30 if each physical quantity and the error information are acquired in ACT 201. The data that is corrected in this manner is used in ACT 205 to ACT 209 that follow.

Returning to the description with reference to the flowchart, the CPU 10 acquires the temperature properness level from the temperature properness level table (ACT 205). The CPU 10 acquires the humidity properness level from the humidity properness level table (ACT 206). The CPU 10 acquires an outdoor air cleanliness properness level from the powder particle mass concentration properness level table (ACT 207). The CPU 10 acquires an indoor air cleanliness properness level from the powder particle mass concentration properness level table (ACT 208). The CPU 10 acquires a number-of-times-of-hardware-caused power-off properness level from the number-of-times-hardware-caused power-off table (ACT 209).

Because all the individual properness levels are described as being acquired in ACT 205 to ACT 209, the CPU 10 generates the environment properness level by using Equation 1 described above for calculation (ACT 210). As weighting coefficient $k(n)$, weighting coefficient $k(n)$ that is copied or is set in ACT 202 is used.

The CPU 10 performs a weighting coefficient change processing that will be described below (ACT 211). The CPU 10 updates the operating environment evaluation DB with all the individual properness levels that are acquired in ACT 205 to ACT 209, the environment properness level that is acquired in ACT 210, and the weighting coefficient that is changed in the weighting coefficient change processing (ACT 212), and ends the present processing.

Figure 7:
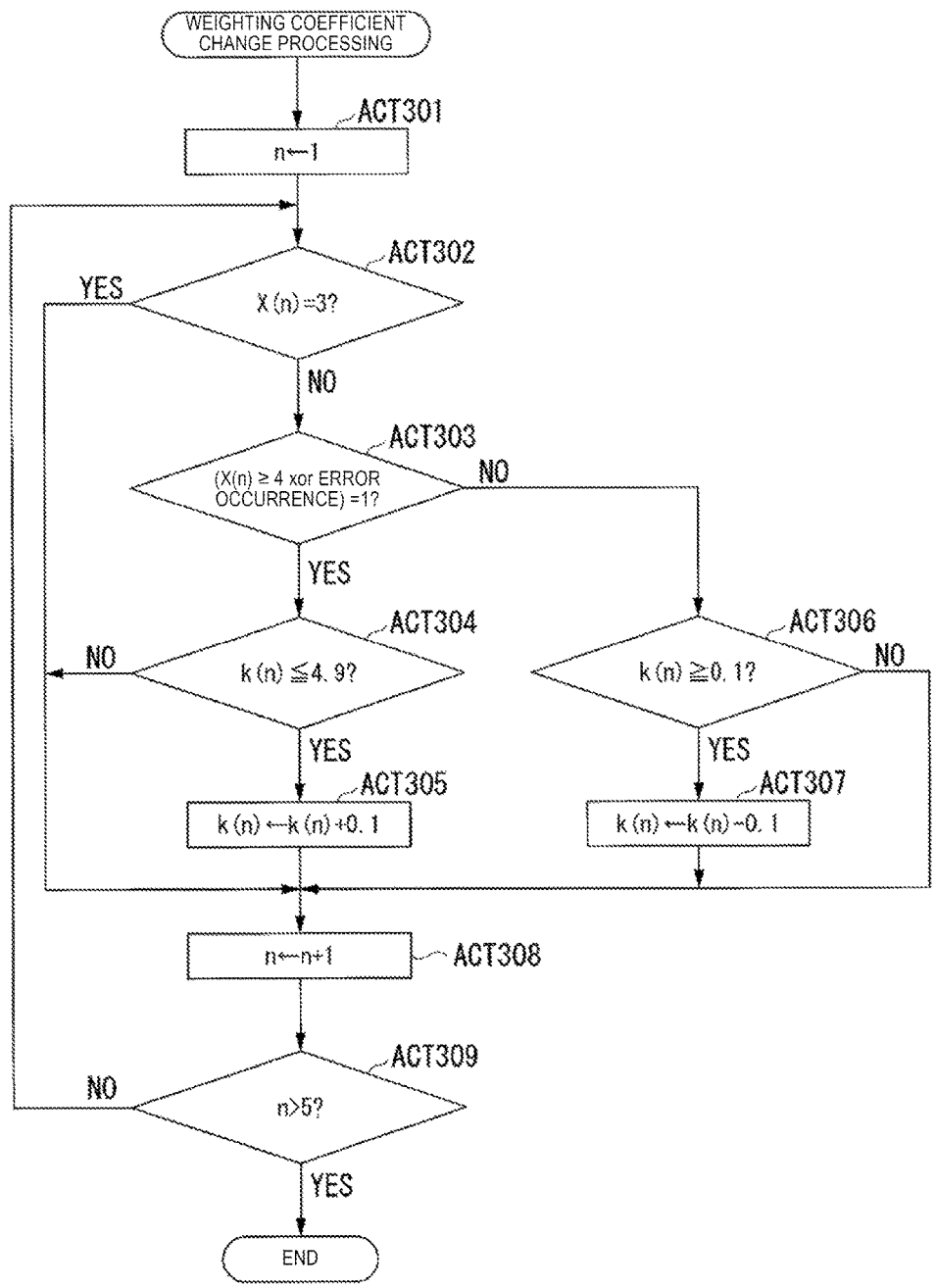
FIG. 7 is a flowchart illustrating a flow of weighting coefficient change processing.

FIG. 7 is a flowchart illustrating a flow of the weighting coefficient change processing in ACT 211 in FIG. 6. In FIG. 7, the CPU 10 initializes loop counter n to 1 (ACT 301). Because the weighting coefficient is in a range of $k(1)$ to $k(5)$, n is counted up to 5. The CPU 10 determines whether or not $X(n)$ is 3 (ACT 302). If $X(n)$ is 3 (YES in ACT 302), the CPU 10 proceeds to ACT 308.

If $X(n)$ is not 3 (NO in ACT 302), the CPU 10 determines whether or not exclusive OR (XOR), that is, "$X(n) \geq 4$" and "error occurrence" is 1 (true) (ACT 303). At this point, "error occurrence" means that, with reference to the error data that is added at this point in time and the error data at a previous point in time, an error occurs successively in the same manner as at the previous point in time, in the error DB that is newly updated in ACT 202.

Therefore, in ACT 303, if any of "$X(n) \geq 4$" and "error occurrence" is true, it is determined that a positive result is obtained, and if both are true or both are false, it is determined that a negative result is obtained. If it is determined in ACT 303 that the positive result is obtained (YES in ACT 303), the CPU 10 determines whether or not $k(n) \leq 4.9$ (ACT 304).

If $k(n) \leq 4.9$ is not satisfied (NO in ACT 304), the CPU 10 proceeds to ACT 308. If $k(n) \leq 4.9$ (YES in ACT 304), the CPU 10 adds 0.1 to $k(n)$ (ACT 305), and proceeds to ACT 308.

In ACT 303, if it is determined that the negative result is obtained (NO in ACT 303), the CPU 10 determines whether or not $k(n) \geq 0.1$ (ACT 306). If $k(n) \geq 0.1$ is not satisfied (NO in ACT 306), the CPU 10 proceeds to ACT 308. If k(n)≥0.1 (YES in ACT 306), the CPU 10 subtracts 0.1 from k(n) (ACT 307), and proceeds to ACT 308.

The CPU 10 increments n by 1 (ACT 308), and determines whether or not n is greater than 5 (ACT 309). If n is equal to or smaller than 5 (NO in ACT 309), the CPU 10 returns to ACT 302. If n is greater than 5 (YES in ACT 309), the CPU 10 ends the present processing. With the updating of the operating environment evaluation DB in ACT 212 in FIG. 6, the weighting coefficient that is changed in this manner is updated as a new weighting coefficient.

With the weighting coefficient change processing described above, the weighting coefficient is changed as follows. First, if the properness level is 3, regardless of whether "error occurrence" is true or false in ACT 303, the weighting coefficient is not changed. If the properness level is equal to or greater than 4, if "error occurrence" is true in ACT 303, the weighting coefficient decrease by 0.1. If the properness level is equal to or greater than 4, if "error occurrence" is false in ACT 303, the weighting coefficient increases by 0.1.

If the properness level is equal to or smaller than 2, if "error occurrence" is true in ACT 303, the weighting coefficient increases by 0.1. If the properness level is equal to or smaller than 2, if "error occurrence" is false in ACT 303, the weighting coefficient decreases by 0.1. In this manner, the environment properness level can be suitably generated by changing the weighting coefficient using a value of the weighting coefficient and "error occurrence."

Figure 8:
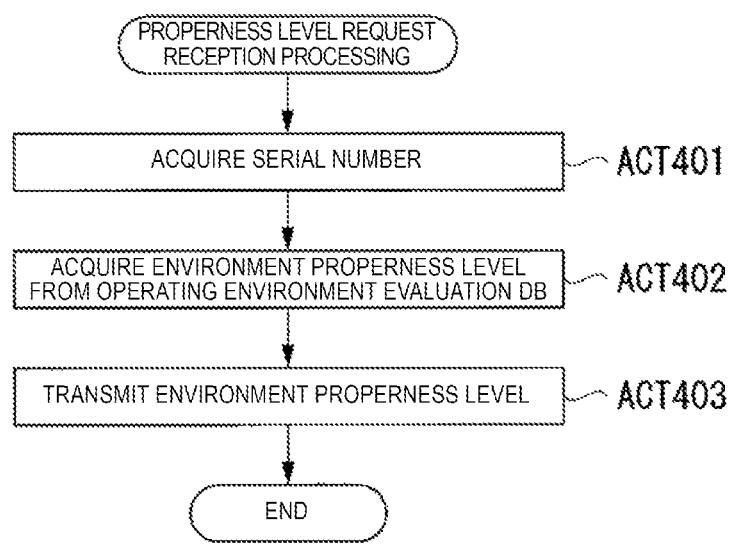
FIG. 8 is a flowchart illustrating a flow of properness level request reception processing.

FIG. 8 is a flowchart illustrating a flow of the properness level request reception processing. In FIG. 8, the CPU 10 acquires the serial number that is set, as a parameter, to be in the properness level request (ACT 401). The CPU 10 searches the operating environment evaluation DB with the acquired serial number as a key, and acquires the environment properness level from an operating environment evaluation data that is found as a result of the search (ACT 402). The CPU 10 transmits the acquired environment properness level to the different apparatus that transmits the properness level request (ACT 403), and ends the present processing. With the properness level request reception processing described above, the environment properness level of the image processing apparatus of which the service technician is in charge can be easily identified.

Figure 9:
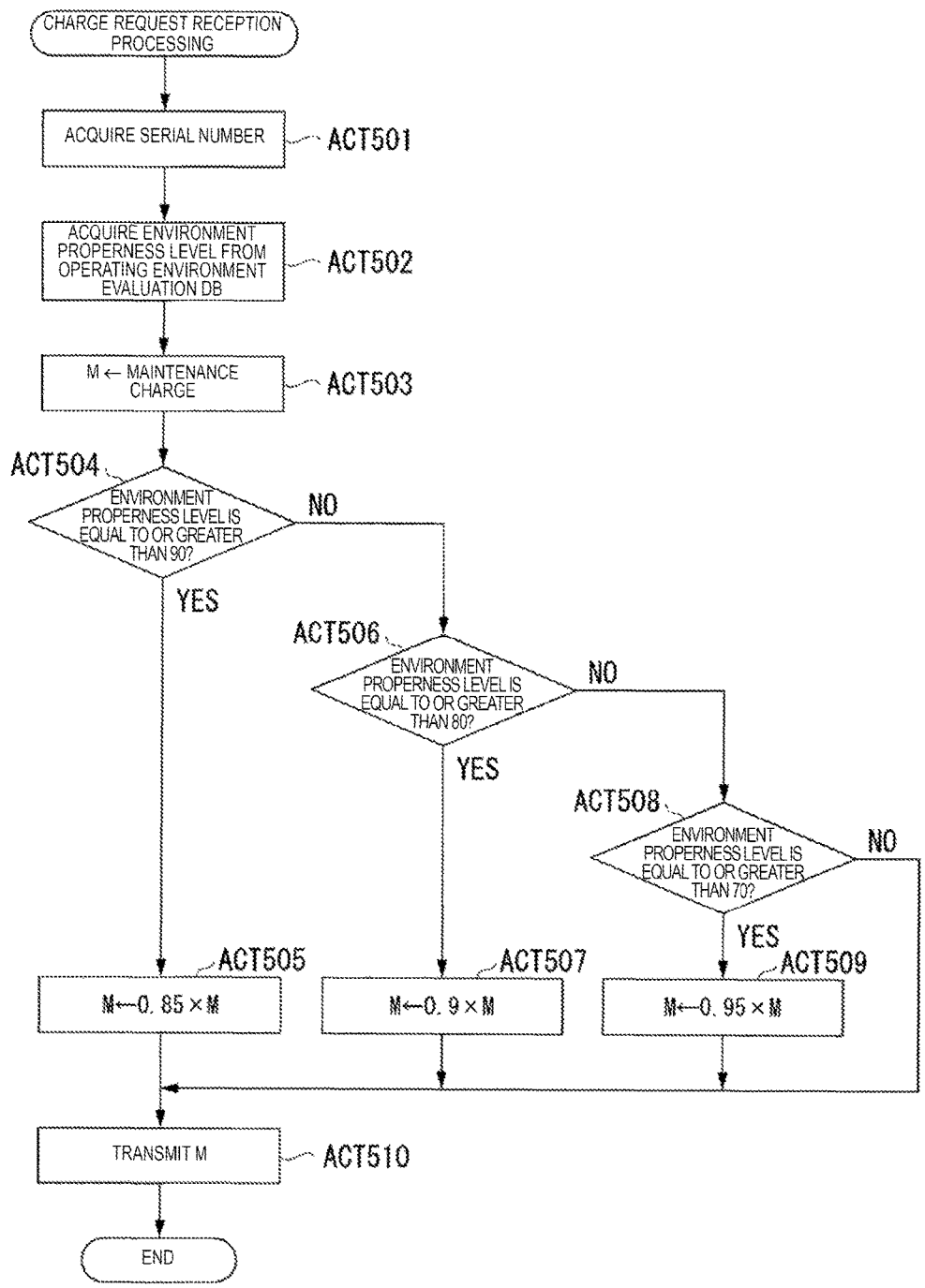
FIG. 9 is a flowchart illustrating a flow of charge request reception processing.

FIG. 9 is a flowchart illustrating a flow of the charge request reception processing. In FIG. 9, the CPU 10 acquires the serial number that is set, as a parameter, to be in the charge request (ACT 501). The CPU 10 searches the operating environment evaluation DB with the acquired serial number as a key, and acquires the environment properness level from an operating environment evaluation data that is found as a result of the search (ACT 502).

The CPU 10 acquires maintenance charge M that is set, as a parameter, to be in the charge request (ACT 504). The CPU 10 determines whether or not the environment properness level is equal to or greater than 90 (ACT 504). If the environment properness level is equal to or greater than 90 (YES in ACT 504), maintenance charge M is assumed to be discounted by 15%. For this reason, the CPU 10 multiplies maintenance charge M by 0.85 (ACT 505), transmits new maintenance charge M to the different apparatus that transmits the charge request (ACT 510), and ends the present processing.

In ACT 504, if the environment properness level is neither equal to nor greater than 90 (NO in ACT 504), it is determined whether or not the environment properness level is equal to or greater than 80 (ACT 506). If the environment properness level is equal to or greater than 80 (YES in ACT 506), maintenance charge M is assumed to be discounted by 10%. For this reason, the CPU 10 multiplies maintenance charge M by 0.9 (ACT 507), transmits new maintenance charge M to the different apparatus that transmits the charge request (ACT 510), and ends the present processing.

In ACT 506, if the environment properness level is neither equal to nor greater than 80 (NO in ACT 506), it is determined whether or not the environment properness level is equal to or greater than 70 (ACT 508). If the environment properness level is equal to or greater than 70 (YES in ACT 508), maintenance charge M is assumed to be discounted by 5%. For this reason, the CPU 10 multiplies maintenance charge M by 0.95 (ACT 509), transmits new maintenance charge M to the different apparatus that transmits the charge request (ACT 510), and ends the present processing.

In ACT 508, if the environment properness level is neither equal to nor greater than 70 (NO in ACT 508), the CPU 10 does not perform discounting. For this reason, without changing a value of maintenance charge M, maintenance charge M is transmitted to the different apparatus that transmits the charge request (ACT 510), and the present processing is ended. In this manner, in the operating environment evaluation system 100, the higher the environment properness level, the more discounted maintenance charge is calculated. Specifically, if the environment properness level is equal to or greater than 90, a discount of 15% is provided. If the environment properness level is smaller than 90 and is equal to or greater than 80, a discount of 10% is provided. If the environment properness level is smaller than 80 and is equal to or greater than 70, a discount of 5% is provided. If the environment properness level is smaller than 70, no discount is provided.

With the charge request reception processing described above, the operator at the maintenance center can immediately acquire the maintenance charge in response to the request from the customer.

With the environment notification reception processing according to the embodiment, which is described above, the data that has to be corrected is corrected, but this correction may be performed only if an error occurs due to a failure in the image processing apparatus.

The environment notification according to the present embodiment is based on data that is obtained from the measuring instrument of the image processing apparatus, but may be based on, for example, data that is obtained from an instrument that is capable of measuring an environment where the image processing apparatus is installed. For example, the environment notification may be based on data that is obtained in a measuring instrument that is installed in the vicinity of the image processing apparatus or in a building system which manages a temperature or the like.

The temperature, the humidity, the outdoor or indoor powder particle mass concentrations, and the number of times of hardware-caused power-off, as physical quantities, are included in the environment notification according to the present embodiment, but these are given as examples. Therefore, the physical quantity that is notified with the environment notification may be anyone of the physical quantities described above, and may be a physical quantity (for example, the number of times of warming up) other than the ones described above.

According to the present embodiment, the environment properness level is calculated using only the physical quantity that is notified with the latest environment notification, but the environment properness level may be calculated using a physical quantity (for example, an average value of the physical quantity that is notified a plurality of times) that is notified with the environment notification that is transmitted a plurality of times in the past.

In the weighting coefficient change processing, the change is performed by adding or subtracting 0.1 to or from the weighting coefficient, but no limitation to this change is imposed. First, a value that is other than 0.1 may be used, and a variable, not a constant, may be used. Additionally, the weighting coefficient may be changed using predetermined learning processing or statistical processing. Furthermore, the weighting coefficient may be changed taking into consideration the physical quantity that is notified by a different image processing apparatus, as well as by one image processing apparatus. A method of changing the weighting coefficient may vary depending on a type of error that occurs. Additionally, the properness level table that is illustrated in FIG. 4 may be suitably changed.

In the charge request reception processing, only the maintenance charge is discounted, but if the environment properness level is lower than a certain reference, the maintenance charge may be increased to include a surcharge.

According to the present embodiment, the operating environment evaluation system 100 is configured with one apparatus, and no limitation to this configuration is imposed. For example, the environment notification reception processing, the weighting coefficient change processing, the properness level request reception processing, and the charge request reception processing may be performed with a plurality of apparatuses.

An apparatus that has to be evaluated in the operating environment evaluation system 100 according to the present embodiment is the image processing apparatus, but, for example, may be a-point-of-sales (POS) terminal.

If the operating environment evaluation system 100 according to the embodiment, which is described above, is provided, it is possible that an operating environment evaluation system is provided which is capable of generating a proper level of an operating environment.

A function of the operating environment evaluation system according to the embodiment, which is described above, may be realized with a computer. In such a case, this function may be realized by recording a program for realizing the function on a computer-readable medium and causing a computer system to read the program recorded on the recording medium for execution. It is noted that the "computer system" here is defined as including an OS and hardware components such as a peripheral device. Furthermore, the "computer-readable recording medium" refers to a portable medium, such as a flexible disk, a magneto-optical disk, a ROM, and a CD-ROM, and a storage device, such as a hard disk, that is built into the computer system. Moreover, the "computer-readable recording media" may include a medium that dynamically retains the program for a short period of time, such as a communication line that is available if transmitting the program over a network such as the Internet or over a communication network such as a telephone network, and a medium that retains the program for a fixed period of time, such as a volatile memory within the computer system, which functions as a server or a client if the program is retained dynamically for a short period of time. Furthermore, the program may be one for realizing some of the functions described above and may be one that can realize the functions described above in combination with a program that is already recorded on the computer system.

While certain embodiments are described, these embodiments are presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and the claims' equivalents are intended to cover such forms or modifications as would fall within the scope and spirit of the inventions.

What is claimed is:

1. An operating environment evaluation system comprising:
 a memory; and
 a processor, coupled to the memory, that facilitates execution of instructions to perform operations, comprising:
 acquiring a physical quantity indicating an operating environment of an image processing apparatus;
 generating an operating environment properness level value for the image processing apparatus based on the physical quantity, wherein the operating environment properness level value is determined as a function of an individual properness level value associated with the physical quantity and a weighting coefficient value associated with the individual properness level value, and wherein the operating environment properness level value is further determined as a function of a suitability value that is determined based on a comparison of abnormal operating environment data caused by a malfunction of the image processing apparatus and data associated with an optimal functioning of the image processing apparatus; and
 transmitting the operating environment properness level value to a receiving device.

2. The system according to claim 1, the operations further comprising:
 acquiring an error that occurs in the image processing apparatus; and
 correcting the physical quantity which corresponds to the error,
 wherein the generating further comprises generating the operating environment properness level value of the image processing apparatus based on the physical quantity that has been corrected.

3. The system according to claim 2, the operations further comprising:
 correcting the physical quantity such that the operating environment properness level value that is generated is higher than if the physical quantity is not corrected.

4. The system according to claim 2, the operations further comprising:
 acquiring the individual properness level value that is a properness level value of each of the physical quantities, and generating a value that is calculated from the individual properness level value and the weighting coefficient value that is provided to each individual properness level value, as the operating environment properness level value.

5. The system according to claim 4, the operations further comprising:
 changing the weighting coefficient value according to the error.

6. The system according to claim 1, the operations further comprising:
 providing the operating environment properness level value to a different apparatus.

7. The system according to claim 1, the operations further comprising:
   calculating a maintenance charge for the image processing apparatus; and
   providing the maintenance charge to a different apparatus, wherein the higher the operating environment properness level value the more discounted a calculated maintenance charge.

8. The system according to claim 1, wherein the physical quantity is a temperature, a humidity, a powder particle mass concentration, or a number of times of hardware-caused power-off.

9. A method of controlling an operating environment evaluation system, comprising:
   causing a physical quantity acquisition unit to acquire a physical quantity indicating an operating environment of an image processing apparatus;
   causing a generation unit to generate an operating environment properness level value for the image processing apparatus based on the physical quantity, wherein the operating environment properness level value is determined as a function of an individual properness level value associated with the physical quantity and a weighting coefficient value associated with the individual properness level value, and wherein the operating environment properness level value is further determined as a function of a suitability value that is determined based on a comparison of abnormal operating environment data caused by a malfunction of the image processing apparatus and data associated with an optimal functioning of the image processing apparatus; and
   transmitting the operating environment properness level value to a receiving device.

10. A non-transitory computer-readable storage medium, comprising executable instructions that, when executed by a processor, facilitate performance of operations, comprising:
   acquiring a physical quantity indicating an operating environment of an image processing apparatus;
   generating an operating environment properness level value for the image processing apparatus based on the physical quantity, wherein the operating environment properness level value is determined as a function of an individual properness level value associated with the physical quantity and a weighting coefficient value associated with the individual properness level value, and wherein the operating environment properness level value is further determined as a function of a suitability value that is determined based on a comparison of abnormal operating environment data caused by a malfunction of the image processing apparatus and data associated with an optimal functioning of the image processing apparatus; and
   transmitting the operating environment properness level value to a receiving device.

* * * * *